(12) United States Patent
Tam

(10) Patent No.: US 8,996,082 B2
(45) Date of Patent: Mar. 31, 2015

(54) PROXIMITY SENSOR ARRANGEMENT HAVING A COLD MIRROR IN A MOBILE DEVICE

(75) Inventor: Ching Yu John Tam, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 1136 days.

(21) Appl. No.: 12/950,461

(22) Filed: Nov. 19, 2010

(65) Prior Publication Data

US 2012/0129580 A1    May 24, 2012

(51) Int. Cl.
*H04M 1/00* (2006.01)
*H04M 1/02* (2006.01)
*G01S 7/481* (2006.01)
*G01S 17/02* (2006.01)

(52) U.S. Cl.
CPC ............ *H04M 1/026* (2013.01); *G01S 7/4813* (2013.01); *G01S 17/026* (2013.01); *H04M 2250/12* (2013.01)
USPC ................ 455/575.8; 455/556.1; 250/227.11; 250/227.14; 356/4.01; 356/4.02

(58) Field of Classification Search
USPC ........................ 455/41.1, 556.1, 575.1, 575.8; 356/4.01, 4.02; 250/221, 222.1, 222.2, 250/214 AL, 214 B, 227.11, 227.14, 227.24
See application file for complete search history.

(56) References Cited

U.S. PATENT DOCUMENTS

| | | | |
|---|---|---|---|
| 6,087,653 A | 7/2000 | Van Schyndel et al. | |
| 6,246,862 B1 | 6/2001 | Grivas et al. | |
| 6,835,923 B2 * | 12/2004 | Hamalainen et al. | 250/227.11 |
| 7,355,164 B2 | 4/2008 | Arnold | |
| 7,714,265 B2 * | 5/2010 | Fadell et al. | 250/214 AL |
| 7,936,983 B2 * | 5/2011 | Konno et al. | 396/14 |
| 8,507,863 B2 * | 8/2013 | Holenarsipur | 250/338.1 |
| 8,536,507 B2 * | 9/2013 | Fadell et al. | 250/214 AL |
| 8,693,877 B2 * | 4/2014 | Tam et al. | 398/130 |

(Continued)

FOREIGN PATENT DOCUMENTS

| CN | 1097254 A | 1/1995 |
|---|---|---|
| WO | WO-9409392 | 4/1994 |

OTHER PUBLICATIONS

International Preliminary Report on Patentability (Chapter 1), mailing date May 30, 2013, for corresponding International Application No. PCT/US2011/060929, 14 pages.

(Continued)

*Primary Examiner* — Edward Urban
*Assistant Examiner* — Rui Hu
(74) *Attorney, Agent, or Firm* — Blakely, Sokoloff, Taylor & Zafman LLP

(57) ABSTRACT

A radiation passing layer has a top surface and a bottom surface below which a proximity sensor is positioned. A visible light opaque layer covers the bottom surface of the radiation passing layer except for an opening therein that allows radiation from the emitter to pass, and scattered radiation to pass to the detector. A radiation shield is between the emitter and the detector, and extends to the bottom of the radiation passing layer. A cold mirror is between the shield and the bottom surface of the radiation passing layer, covering the opening in the opaque layer. A radiation absorber being a separate piece and a different material than the shield provides a radiation seal between the top surface of the shield and the bottom surface of the cold mirror. Other embodiments are also described and claimed.

25 Claims, 3 Drawing Sheets

(56) References Cited

U.S. PATENT DOCUMENTS

| | | | |
|---|---|---|---|
| 8,712,485 B2* | 4/2014 | Tam | 455/575.1 |
| 2003/0025082 A1 | 2/2003 | Brewington et al. | |
| 2006/0016994 A1 | 1/2006 | Basoor et al. | |
| 2008/0006762 A1* | 1/2008 | Fadell et al. | 250/201.1 |
| 2008/0158173 A1* | 7/2008 | Hamblin et al. | 345/173 |
| 2008/0167834 A1* | 7/2008 | Herz et al. | 702/150 |
| 2009/0159900 A1 | 6/2009 | Basoor et al. | |
| 2010/0109021 A1* | 5/2010 | Horio | 257/82 |
| 2010/0207879 A1* | 8/2010 | Fadell et al. | 345/156 |
| 2011/0121181 A1* | 5/2011 | Costello et al. | 250/338.1 |
| 2012/0129579 A1* | 5/2012 | Tam | 455/575.1 |
| 2012/0129580 A1* | 5/2012 | Tam | 455/575.1 |
| 2012/0295665 A1* | 11/2012 | Pantfoerder | 455/566 |
| 2013/0341494 A1* | 12/2013 | Fadell et al. | 250/214 AL |

OTHER PUBLICATIONS

NL Search Report (dated Apr. 29, 2013), Dutch Patent Application 2007823, Date Filed—Nov. 21, 2011, (14 pages).
PCT International Search Report and Written Opinion of the International Searching Authority mailed Feb. 28, 2012 for PCT/US2011/060929.
Srleffler, "Index-matching material", Mar. 10, 2006, p. 1-1, XP55019889, Wikipedia Retrieved from the Internet: URL: http://en.wikipedia.org/w/index.php?title=Index-matching_material&oldid=43210017 [retrieved on Feb. 21, 2012] the whole document.
CN 1st Office Action (dated Apr. 30, 2014), Application No. 201180061684.0, Date Filed Nov. 16, 2011, (18 pages).
CN Search Report (dated Apr. 16, 2014), Application No. 201180061684.0, Date Filed Nov. 16, 2011, (4 pages).

* cited by examiner

PROXIMITY SENSOR ARRANGEMENT HAVING A COLD MIRROR IN A MOBILE DEVICE

FIELD

An embodiment of the invention is directed to a proximity sensor arrangement used in a handheld mobile communications device. Other embodiments are also described.

BACKGROUND

In the field of personal mobile devices such as laptop computers, tablet computers, and smart phones, proximity sensors are used to sense hover events. These are no touch, close proximity positioning of parts of the user's body or other objects (e.g., a stylus held by the user), near an external surface of the device. Typically, such proximity sensors are designed to detect an external object that is located outside the near field detection capability of a touch sensor (e.g., those used in a typical touch screen display such as found in an iPhone™ device by Apple Inc.). In one instance, the proximity sensor includes an infrared emitter and a counterpart infrared detector that are controlled and sampled by proximity sensor circuitry integrated in the housing of the mobile device. Emitted infrared radiation is scattered by the external object, and then detected and analyzed to infer that an external object is (or is not) close to the exterior surface. In the case of handheld mobile communications devices, the sensor may be located near an acoustic aperture for an earpiece speaker (receiver) of a mobile communications handset, and is used to determine when the handset is being held close to the user's ear, as opposed to away from the ear. When the proximity sensor indicates that the external object, in this case, the user's ear or head, is sufficiently close, then a predetermined action is taken, including, for example, turning off or disabling a touch screen display that is on the same external face of the housing as the acoustic aperture. This, of course, is designed to avoid unintended touch events caused by the user's cheek, while the handset is held close to the user's ear during a call.

SUMMARY

An electronic device having a proximity sensor assembly includes a radiation passing layer having a top surface and a bottom surface. A proximity sensor having an emitter and a detector is positioned below the radiation passing layer. A radiation shield positioned between the emitter and the detector extends to the bottom surface of the radiation passing layer. A layer that is opaque to visible light covers the bottom surface of the radiation passing layer except for an opening therein that allows radiation from the emitter to pass, and scattered radiation to pass to the detector. A cold mirror is positioned between the shield and the bottom surface of the radiation passing layer, covering the opening in the visibly opaque layer. A radiation absorber, being a separate piece and of a separate material than the shield, is positioned to provide a radiation seal between a top surface of the shield and the bottom surface of the cold mirror. By virtue of its radiation absorption characteristics, together with its positioning and contact with the bottom of the cold mirror, the absorber may help prevent stray radiation from the emitter that may have been internally reflected within the radiation passing layer, from impinging on the detector. This internally reflected stray radiation (which is attenuated by the absorber) may be caused by original radiation from the emitter that has been internally reflected from oil build-up and residue, also referred to here as smudge, that has formed on the exterior surface of the radiation passing layer due to normal use of the device. As a result, a more accurate proximity sensor may be obtained.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
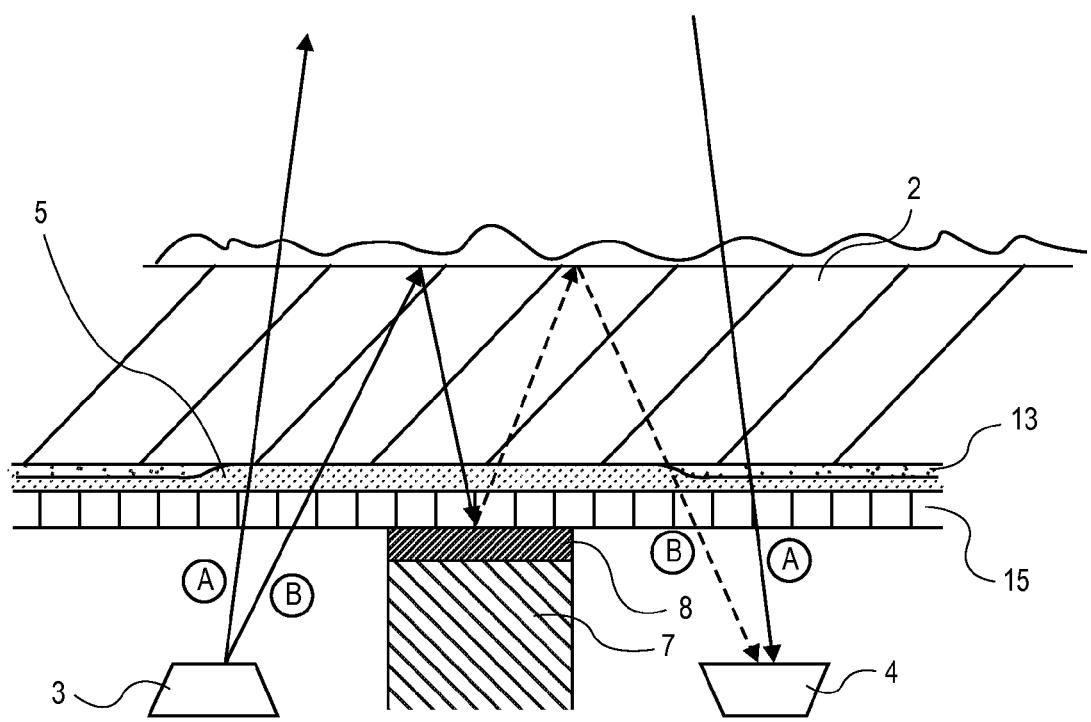
FIG. 1 illustrates relevant portions of an electronic device, in accordance with an embodiment of the invention.

FIG. 1 illustrates relevant portions of an electronic device, in accordance with an embodiment of the invention. A sectional view of the device and, in particular, a region near its exterior surface is shown that contains a radiation passage for a proximity sensor in the device. A radiation passing layer 2 separates an interior region of the device from the outside where an external object is located nearby. The radiation passing layer may be a cover or a cap which, as described further below, may also be a structural layer (e.g., part of a structural plate of the device. It may be flat as shown or somewhat curved, e.g. to provide a lens effect to the passing radiation. It may be made of a single material such as glass, ceramic, polycarbonate, or acrylic, or it may be a composite or laminate of several layers of different materials. It may function as a protective barrier, and/or it may have an aesthetic function to provide a certain look from the outside. In any case, the radiation passing layer 2 is sufficiently transmissive in a radiation band of interest, and in particular in this embodiment the infrared (IR) band, in order to permit an IR proximity sensor that is located below it to function as intended. An instance of the radiation passing layer 2 is the structural layer 11 described below in connection with FIG. 3.

The proximity sensor includes an emitter 3, which emits the radiation (here, IR) and a counterpart detector 4, which is designed to detect impinging radiation. The emitter 3 and the detector 4 have their sensitive surfaces aimed at the radiation passing layer 2, either directly or indirectly (e.g., through a prism or mirror arrangement). Both are controlled and/or sensed electrically by proximity sensor circuitry (not shown). This combination of the emitter, detector and proximity sensor circuitry may be a conventional, microelectronic infrared proximity sensor unit, e.g. an IR light emitting diode (LED)-based unit with a built-in light collector (lens), analog to digital conversion circuitry, and a digital communication interface to a processor (not shown). The detector may be part of a shared microelectronic device that can also be used to detect in other radiation bands, e.g. visible light. The data processor may be running proximity software that analyzes readings or samples from the proximity sensor circuitry, based on what has been emitted and what has been detected (as scattered or reflected radiation from the external object). The proximity software may then make a determination as to whether the external object is close, far, or in between.

Between the emitter 3 and the detector 4 is a radiation shield 7 that extends upwards to the bottom surface of the radiation passing layer 2, as shown. The shield in this case has a simple solid or polyhedron shape, but alternatively may have a more complex shape such as a T-shape. At its bottom, the radiation shield 7 may be secured to a frame (not shown) or a printed circuit board (not shown) on which the emitter 3 and the detector 4 are also installed.

The shield 7 serves to block stray radiation originating from the emitter 3, i.e. by at least reflecting stray radiation but may also absorb some of it to a limited extent. The shield's top surface could be in effect affixed to the bottom of the radiation passing layer, by virtue of being glued or bonded to the bottom of an absorber 8; alternatively, its top surface could simply rest against the absorber 8, and be affixed at its bottom to a printed circuit board or other substrate or platform on which the proximity sensor is installed. The shield 7 could be a structural wall that can bear a vertical load; alternatively it could just be a fence. An instance of the shield 7 is the frame member 14 described below in connection with FIG. 3

As seen in FIG. 1, the top surface of the shield 7 may be in contact with and conforming to an absorber 8. The radiation absorber 8 may be a separate piece and of a different material than the shield 7, and is positioned to provide a radiation seal between a top surface of the shield 7 and a bottom surface of a cold mirror 15. The cold mirror 15 is positioned between the absorber 8 and the bottom of the radiation passing layer 2, covering an opening 5 in a visible light opaque layer 13 as shown. The opening 5 allows radiation from the emitter 3 to pass and be scattered by a nearby external object, and then return to impinge on the detector 4. A gap-free joinder of the three components (the shield 7, the absorber 8, and the bottom of the cold mirror 15) is desired in order to provide a proper radiation seal along the shield, in a horizontal or "Z" direction that is perpendicular to the plane of the sectional view shown in FIG. 1. This may be achieved by having the surfaces of those components conform to each other as shown. In addition, the absorber 8 may be bonded to the bottom of the cold mirror 15 via an adhesive layer (not shown in FIG. 1) that contains an index-matching material, which reduces the difference in refraction index (for the radiation band used by the proximity sensor) between the absorber 8 and the cold mirror 15.

The cold mirror 15 may be a dielectric mirror of a suitable thickness that has the following characteristics: reflectance of 50%-90% in the visible band, and reflectance of 0%-10% in the IR band; and transmittance of 0%-10% in the visible band, and transmittance of 50%-90% in the IR band. The cold mirror 15 may be a separate piece of a substrate (e.g., similar or even identical to that of the radiation passing layer 2) which is transparent under visible light and to which a coating has been applied that is reflective of visible light and at the same time sufficiently transmissive of infrared. A top surface of the cold mirror may be been bonded to the bottom of the radiation passing layer 2 in a position that covers the opening 5 in the visible opaque layer 13 as shown, thereby hiding the opening 5 from view.

The absorber 8 covers the adjoining surfaces of the cold mirror 15 and the shield 7 but leaves open and separates two areas that are aligned with the opening 5 in the opaque layer 13, and in effect form part of the radiation passage of the proximity sensor. This permits transmitted radiation and reflected/scattered radiation to pass, in this case in a substantially vertical direction, through the radiation passing layer 2 as shown, enabling the proximity sensor to work. The absorber 8 could be an otherwise continuous layer having two holes formed therein as shown in the top view of FIG. 5.

The absorber 8 has a thickness in the vertical direction, and a width and length in the horizontal directions so as to sufficiently absorb stray radiation that has been internally reflected in the radiation passing layer 2—this is depicted as a dotted line arrow and labeled "B" in the FIGS. The stray internal reflections (B) may begin at the top surface of the radiation passing layer 2 on which there may be a build-up or residue (on the exterior surface of the electronic device). This build-up or residue may be due to contact with a user's skin during normal use of the device, which may leave an oily film that also catches dust particles, thereby leaving a build-up that may facilitate the undesired internal reflections (B) within the radiation passing layer 2. The absorber 8 may be expected to significantly attenuate such reflections, without inhibiting the desired reflections, that are depicted as dotted line arrow and labeled "A", from reaching the detector 4. In other words, the absorber 8 helps in reducing the stray radiation that would otherwise be able to get past the shield 7 via the path "B" as shown (and impinge on the detector 4). This may help the proximity sensor circuitry to operate more accurately when providing a measure of the external object scattered or reflected radiation.

In one embodiment, the absorber 8 has the following characteristics in an infrared band 700 nm to 1,100 nm: transmittance less than five percent (5%), and reflectance less than ten percent (10%). Such characteristics may be achieved by a film or sheet that is made of polyester or plastic. More generally, the film or sheet should have greater infrared absorption characteristics than the radiation shield 7 (for the same thickness and its other dimensions). In one instance, the absorber 8 is made of a film or sheet that is of a different material than the shield 7. The shield 7 may need to achieve other purposes (such as strength and low cost) that might sacrifice its radiation absorption characteristics. For instance, the shield 7 may be particularly rigid (e.g., made of metal or a high strength plastic) and therefore unable to function as a radiation absorbing seal while being directly in contact with the bottom surface of the cold mirror 15. One reason may be that it cannot conform sufficiently to the bottom surface of the cold mirror 15 in a horizontal plane, in order to avoid any gaps. The presence of such gaps may allow radiation to pass between the emitter side and the detector side, in the form of internal reflections that are not sufficiently attenuated. Another reason for the inadequacy of the shield 7 acting by itself may be that it is of a material that does not have sufficiently high radiation absorption characteristics. By combining the shield 7 and the absorber 8, together they may form a barrier that has essentially no radiation gaps between the bottom surface of the cold mirror 15 at one end, and the emitter and/or detector at another end.

Figure 5:
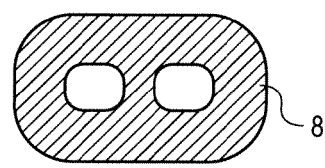
FIG. 5 is a top view of an example radiation absorber.

As depicted in FIG. 5, the absorber may be formed as a mask that has two holes formed therein at positions that are directly above the emitter 3 and the detector 4 (once installed in position). It may be a film or sheet that is to be joined to the bottom surface of the cold mirror 15, and/or to the top surface of the shield 7. For instance, the sheet may be attached by an intermediate adhesive layer, such as a double-sided piece of tape or as a thin layer of infrared transmissive adhesive fluid; as a film it may be deposited or rolled onto the bottom surface of the cold mirror 15 in the form of a liquid or gel which is then allowed to cure while in contact with the top surface of the shield 7. Other ways of manufacturing the stacked arrangement of the cold mirror 15, the absorber 8, and the shield 7 may be possible.

Figure 2:
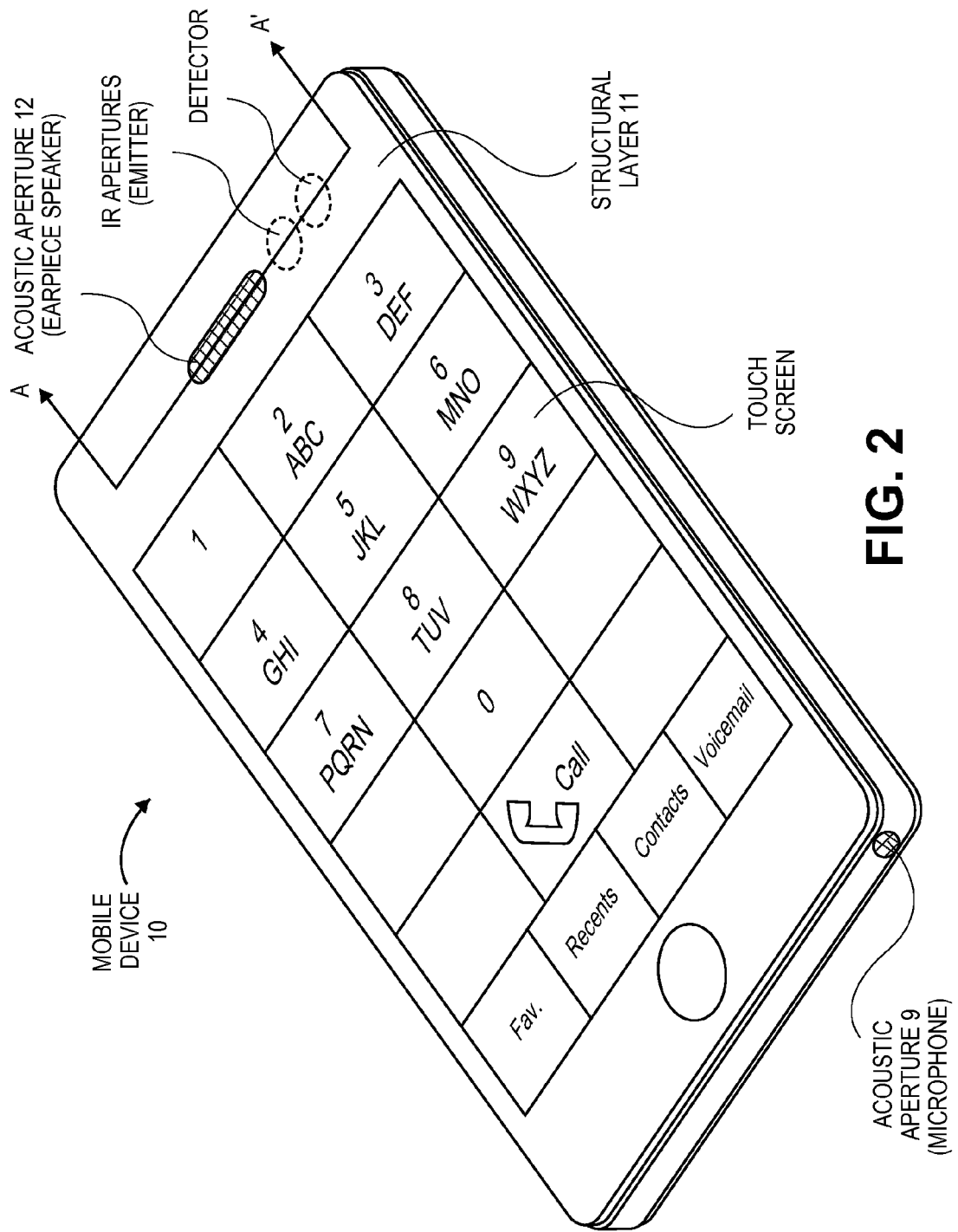
FIG. 2 depicts an example mobile device in which an embodiment of the invention can be implemented.

Turning now to FIG. 2, an example mobile device 10 in which an embodiment of the invention can be implemented is shown. This particular example is a smart phone having an exterior housing that is shaped and sized to be suitable for use as a mobile telephone handset. The mobile device 10 may be a personal wireless communications device that allows two-way real-time conversations (generally referred to as calls) between a near-end user that may be holding the device 10 against her ear, and a far-end user. There is a connection over one or more communications networks between the mobile device 10 and a counterpart device of the far-end user. Such networks may include a wireless cellular network or a wireless local area network as the first segment, and any one or more of several other types of networks such as transmission control protocol/internet protocol (TCP/IP) internetworks and plain old telephone system networks. The near-end user listens to the call using an earpiece speaker located within the housing of the device and that is acoustically coupled to an acoustic aperture 12 formed near the top of the housing. The near-end user's speech may be picked up by a microphone whose acoustic aperture 9 is located near the bottom of the housing. Also included in the housing are conventional electronic components such as an audio codec circuit that interfaces transducers such as the speaker and the microphone with digital audio signal processing components. The audio codec circuitry may also allow the user to listen to the call through a wireless or wired headset that is connected to the handset portion of the mobile device 10. The call may be conducted by establishing a connection through a wireless network, with the help of RF communications circuitry coupled to an antenna that are also integrated in the housing of the device 10.

A user interacts with the mobile device 10 in this case by way of a touch screen that is formed in the front exterior face or surface of the housing. The touch screen may be below the acoustic aperture 12 (earpiece speaker), and above the acoustic aperture 9 (microphone). As an alternative, a physical keyboard may be provided together with a display-only screen, as used in earlier cellular phone devices. As another alternative, the housing of the mobile device 10 may have a moveable component, such as a sliding and tilting front panel, or a clamshell structure, instead of the chocolate bar type depicted. FIG. 2 also depicts a graphical user interface of a telephony application program that is running in the device 10 (e.g., stored in non-volatile solid state memory and being executed by an applications processor). The graphical user interface causes a virtual telephone keypad to be displayed as shown, together with related virtual buttons that can be actuated by touch events of the near-end user initiating a call, accessing a stored contacts list of the user, and accessing a voicemail box of the user.

In one instance, the wireless telephony handset (shown here as the mobile device 10) has a structural layer 11 that may be a rigid, visible light transparent plate that begins at the top of the housing as shown and may extend down towards the bottom, forming most of the exterior front face of the housing. The structural layer 11 is an infrared light passing layer whose top face is part of the exterior face of the housing and acting as a protective cover for the touch screen, and whose bottom face is inside the housing (not shown). In this case, the structural layer 11 also serves as an outer protective layer of the touch screen and is therefore transparent in the visible band as well. A proximity sensor having an infrared emitter and an infrared detector both positioned below the bottom face of the structural layer 11, inside the housing, are located directly underneath the apertures indicated by dotted lines in FIG. 2. In the plane defined by the front exterior face of the mobile device 10, these infrared apertures are located above the virtual telephone keypad that is being displayed by the touch screen, closer to the acoustic aperture 12 (earpiece speaker) than the acoustic aperture 9 (microphone). A sectional view of a relevant region inside housing along the lines A, A' is shown in FIG. 3.

Figure 3:
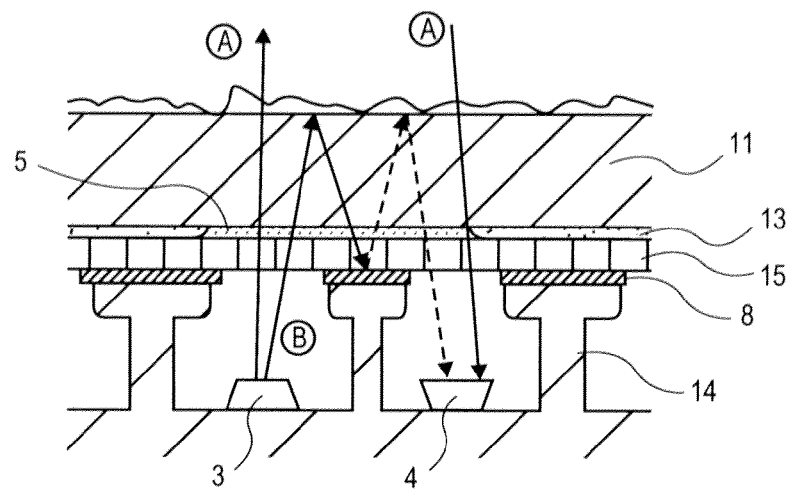
FIG. 3 is a sectional view along the line A, A' of FIG. 2.

As seen in FIG. 3, the acoustic aperture 12 is formed in the structural layer 11, to the side of a region through which infrared radiation will pass for operation of the proximity sensor. An internal frame member 14 is positioned between the emitter 3 and the detector 4, where the frame member 14 (as an instance of the shield 7, see FIG. 1) serves to block infrared radiation between the emitter and the detector. In addition, the internal frame member 14 may be designed (with the appropriate size and shape, as well as material) to assist in maintaining a rigid overall housing structure, by serving as a weight bearing column or wall, against the bottom surface of the structural layer 11. The frame member 14 extends upwards to the bottom face of the structural layer 11 where it meets a radiation absorber 8 formed between a top surface of the frame member 14 and the bottom surface of the cold mirror 15. The frame member extends continuously upward and in effect joins the bottom face of the cold mirror 15 through the absorber 8, in order to form a wall that has no infrared radiation gaps between the bottom surface of the cold mirror 15 and the emitter and detector. In this case, the frame member has a T-shaped cross section as shown, where the absorber 8 conforms to the top of the T-shape cross-section. The absorber 8 (as described above in connection with FIG. 1) serves to absorb internally reflected infrared radiation (originating as rays "B" that would otherwise make their way to the detector 4 as indicated by a dotted line), where such may have been caused by build-up or residue shown on the top face of the structural layer 11. This reduces the amount of stray radiation that impinges on the detector 4, which may increase the accuracy of the proximity sensor. Note that the emitter 3 and the detector 4 have been installed, in this example, on the same microelectronic or printed circuit board carrier, which may be a rigid printed circuit board piece. Other options for installing these components of the proximity sensor within the housing of the mobile device 10 are possible.

In this case, the proximity sensor arrangement, including the absorber 8, has been integrated in the mobile device 10 in such a way as to provide the mobile device 10 with an external look that has a uniformly opaque and light color, hiding from view the internal components of the device 10 that would otherwise be visible if the structural layer 11 itself were visible light transparent. This may be achieved by the following arrangement of layers. A visible light opaque layer 13 is formed in contact with the bottom face of the structural layer 11, with an opening therein being aligned with the emitter 3 and with the detector 4 of the proximity sensor (to allow the sensor's IR radiation to pass). The opaque layer 13 may be a white paint or ink coating (which is opaque in the visible band) that has been deposited or rolled onto the bottom surface of the structural layer 11 and allowed to cure, while the opening has been masked off. The opaque layer 13 gives the exterior face of the device 10 a uniform and light-colored look from the outside (as the structurally layer 11 may be transparent in the visible band). A purpose of the opening in the opaque layer 13 is to allow infrared radiation to pass, as needed by the proximity sensor, because the white paint coating may not have sufficient transmissivity in the infrared band. Next, the cold mirror 15 is affixed to the bottom of the structural layer 11 as shown, covering the opening of the opaque layer 13. The cold mirror 15 serves to complete the uniform appearance to the exterior face of the housing, by hiding the opening that has been formed in the opaque layer 13, while still allowing sufficient transmissivity to the IR radiation for the proximity sensor to work. Next, the absorber 8 is applied over the cold mirror 15 as shown. As described above in connection with FIG. 1, the absorber 8 may include a Mylar® film or sheet that is separate from but that may be bonded to the bottom surface of the cold mirror 15; alternatively, it may be bonded to the top surface of the frame member 14, prior to being brought into contact with the bottom of the cold mirror 15. The film or sheet may be a polyester film or a plastic sheet that has greater infrared absorption characteristics than that of the frame member 14, for the same dimensions, e.g. thickness in the vertical direction. For instance, the absorber may have a transmittance of less than five percent (5%) and a reflectance of less than ten percent (10%), in an infrared band 700 nm to 1,100 nm. As an alternative, the infrared band may be slightly wider or narrower, but the transmittance should be about less than 5% and the reflectance should be about less than 10% in such bands.

Figure 4:
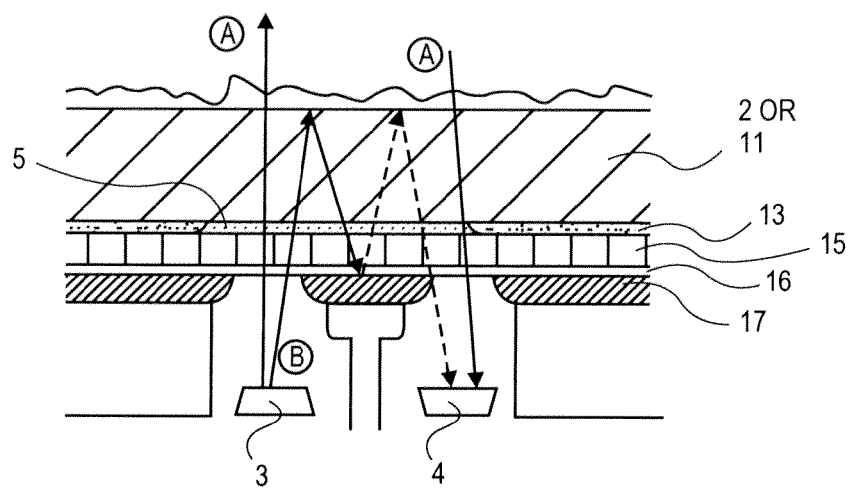
FIG. 4 is a sectional view of the proximity sensor arrangement, according to another embodiment of the invention.

FIG. 4 shows another embodiment of the invention where the absorber 8 is composed of an infrared passing adhesive layer 16 (e.g., an optically clear adhesive fluid) in contact with the top face of and an absorbing layer 17 (e.g., a Mylar® sheet patterned as shown in FIG. 5). The adhesive fluid may be an index matching material that reduces differences in index of refraction (within the infrared band used by the proximity sensor) between the absorber 8 and the cold mirror 15. The two holes may actually be physical holes made only in the absorbing layer 17, and not in the infrared passing adhesive layer 16, and are aligned with, and in effect form a part of the radiation passage of, the emitter 3 and the detector 4 (which may be directly below these holes). Alternatively, the adhesive layer 16 may be first applied only to the top face of the patterned piece (absorbing layer 17). The absorber 8 is then pressed against the bottom surface of the cold mirror 15, to form the arrangement as shown. The structure in FIG. 4 may be otherwise the same as that of FIG. 3.

A method for manufacturing such the mobile device 10 may proceed as follows. Referring to FIG. 3 and FIG. 4, a bottom or rear face of a visible transparent cover or cap (an instance of the structural layer 11 or radiation passing layer 2) is prepared to receive a coat of visibly opaque and light colored (e.g., white) paint thereon. One or more paint masks that may be located directly in the radiation path of an emitter and a detector of a proximity sensor are applied to the prepared surface. The opaque paint layer is then applied and allowed to cure. The mask is removed thereby exposing the bottom surface of the cover at the IR apertures, which may be located directly above the emitter and the detector. A thin layer of IR clear adhesive is applied to the top face of a cold mirror, which is then is aligned with the IR apertures and then bonded to the bottom of the cover. Note that the adhesive may be an index matching material, for reducing differences between the index of refraction of the cover and that of the cold mirror. Next, an absorber is then applied as either a single film or as a multi-layer structure, with openings that are aligned with the one in the opaque paint layer. For instance, an IR clear adhesive may be applied to the bottom of the cold mirror or to a top face of an IR absorbing layer 17, which is then adhered to the cold mirror. Alternatively, the adhesive may be applied to the bottom of the cold mirror only, and then the IR absorbing layer 17 is pressed onto the bottom of the cold mirror against the adhesive. Additional operations may be needed prior to the above or thereafter, before the cover has been completed and is ready to be installed into the housing. At that point, the cover is positioned into the housing, with its IR apertures and openings being aligned with the emitter and the detector locations, and is brought into contact with the top surface of the internal frame member 14. The cover is then fixed in that position and becomes the exterior front face of the housing.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the drawings depict different layers being in contact with each other (e.g., in FIG. 3, layer 13 is in contact with the bottom of layer 11, and the absorber is in contact with the cold mirror 15), this does not preclude an additional or intermediate layer between them so long as the purposes of the radiation seal achieved by the absorber 8, including that of attenuating the stray internal reflections within the layer 11, are not thwarted. The description is thus to be regarded as illustrative instead of limiting.

What is claimed is:

1. An electronic device comprising:
    a radiation passing layer having a top surface and a bottom surface;
    a proximity sensor having a radiation emitter and a radiation detector, both positioned below the radiation passing layer;
    a visibly opaque layer covering the bottom surface of the radiation passing layer except for an opening that allows radiation from the emitter to pass, and scattered radiation to pass to the detector;
    a radiation shield positioned between the emitter and the detector, and extending to the bottom surface of the radiation passing layer;
    a cold mirror positioned between the shield and the bottom surface of the radiation passing layer, covering said opening in the visibly opaque layer; and
    a radiation absorber being a separate piece and of a different material than the shield and positioned to provide a radiation seal between a top surface of the shield and a bottom surface of the cold mirror.

2. The device of claim 1 wherein the absorber comprises a film or sheet that is separate from but that has been joined to the bottom surface of the cold mirror and/or the top surface of the shield.

3. The device of claim 2 wherein the film or sheet is of a different material than the shield.

4. The device of claim 2 wherein the film or sheet has greater infrared absorption characteristics than that of the radiation shield.

5. The device of claim 2 wherein the film or sheet is one of a polyester film and a plastic sheet.

6. The device of claim 1 wherein the absorber is formed as a mask that has two holes formed therein directly above the emitter and the detector, respectively.

7. The device of claim 1 wherein the absorber has the following characteristics in an infrared band 700 nm to 1100 nm: transmittance less than 5% and reflectance less than 10%.

8. The device of claim 1 wherein the cold mirror comprises a piece of visible light reflective substrate to which an infrared transparent coating has been applied, wherein the piece has been bonded to the radiation passing layer.

9. An electronic device comprising:
   a wireless telephony handset housing having an infrared light passing cover whose top face is part of an exterior face of the housing and whose bottom face is inside the housing;
   a proximity sensor having an infrared emitter and an infrared detector both positioned below the bottom face of the cover, inside the housing;
   a visible light opaque layer covering the bottom surface of the cover except for an opening that allows infrared radiation from the emitter to pass, and scattered infrared radiation to pass to the detector;
   an internal frame member positioned between the emitter and the detector, the frame member to block infrared radiation between the emitter and the detector;
   a cold mirror positioned between the internal frame member and the bottom surface of the cover, covering said opening in the opaque layer; and
   an infrared absorber formed between a top surface of the frame member and a bottom surface of the cold mirror.

10. The device of claim 9 wherein the internal frame member extends continuously upward and joins the bottom surface of the cold mirror through the infrared absorber.

11. The device of claim 9 further comprising an earpiece speaker and a microphone both inside the housing, a top face to bottom face acoustic aperture formed in the cover and acoustically coupled to the earpiece speaker, and wherein the proximity sensor is positioned closer to the aperture than the microphone.

12. The device of claim 9 wherein the cover is flat, the frame member has a T-shape, and the absorber conforms to a top of the T-shape.

13. The device of claim 9 wherein the absorber comprises a film or sheet that is separate from but that has been joined to a) on one face, the bottom surface of the cold mirror, and/or b) on an opposite face, the top surface of the frame member.

14. The device of claim 13 wherein the film or sheet is one of a polyester film and a plastic sheet that has been bonded to the cold mirror via an adhesive containing an index-matching material.

15. The device of claim 13 wherein the film or sheet has greater infrared absorption characteristics than that of the frame member.

16. The device of claim 9 wherein the absorber is formed as a mask that has two holes formed therein directly above the emitter and the detector, respectively.

17. The electronic device of claim 9 wherein the absorber has the following characteristics in an infrared band 700 nm to 1100 nm: transmittance less than 5% and reflectance less than 10%.

18. The electronic device of claim 9 further comprising a touch screen whose top face is part of the exterior face of the housing, and whose bottom face is inside the housing.

19. The electronic device of claim 18 wherein the infrared light passing cover forms part of and is an outer protective layer of the touch screen as well as a structural layer of the housing.

20. The electronic device of claim 9 wherein the visible light opaque layer is white and is in contact with a bottom face of the light passing cover, the opening is a single opening over both of the emitter and the detector, and the cold mirror covers the single opening to give a uniform appearance to the exterior face of the housing.

21. The electronic device 20 wherein the absorber is in contact with the bottom surface of the cold mirror and has two holes formed therein aligned with the emitter and the detector, respectively.

22. A method for manufacturing an electronic device, comprising:
   applying an infrared absorber to a cold mirror, wherein the cold mirror covers an opening in a visible light opaque layer that has been applied to a cover, the absorber having the following characteristics in an infrared band 700 nm to 1100 nm, namely transmittance less than 5% and reflectance less than 10%; and then
   positioning the cover into an exterior housing of a mobile device and fixing the cover in place while the absorber is in contact with a top surface of an internal frame member in the housing that lies between an infrared emitter and an infrared detector of a proximity sensor in the housing, the opening being aligned with a radiation passage for the emitter and the detector.

23. The method of claim 22 further comprising aligning the cold mirror with the opening in the opaque layer and then bonding the cold mirror, as aligned, to a surface of the cover, before positioning the cover into the housing of the mobile device.

24. A method for manufacturing an electronic device, comprising:
   applying an infrared absorber to a cold mirror, wherein the cold mirror covers an opening in a visible light opaque layer that has been applied to a cover; and then
   positioning the cover into an exterior housing of a mobile device and fixing the cover in place while the absorber is in contact with a top surface of an internal frame member in the housing that lies between an infrared emitter and an infrared detector of a proximity sensor in the housing, the opening being aligned with a radiation passage for the emitter and the detector, the infrared absorber being a separate piece and of a different material than the internal frame and positioned to provide a radiation seal between a top surface of the internal frame and a bottom surface of the cold mirror.

25. The method of claim 24 further comprising aligning the cold mirror with the opening in the opaque layer and then bonding the cold mirror, as aligned, to a surface of the cover, before positioning the cover into the housing of the mobile device.

* * * * *